(12) United States Patent
Etienne et al.

(10) Patent No.: US 9,588,264 B2
(45) Date of Patent: Mar. 7, 2017

(54) BEZEL-CONCEALING DISPLAY COVERS AND DISPLAY DEVICES

(71) Applicants: Michael Etienne, Corning, NY (US); Jacques Gollier, Painted Post, NY (US); Daniel Aloysius Nolan, Corning, NY (US); Wendell Porter Weeks, Corning, NY (US)

(72) Inventors: Michael Etienne, Corning, NY (US); Jacques Gollier, Painted Post, NY (US); Daniel Aloysius Nolan, Corning, NY (US); Wendell Porter Weeks, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 87 days.

(21) Appl. No.: 13/647,818

(22) Filed: Oct. 9, 2012

(65) Prior Publication Data

US 2013/0235560 A1   Sep. 12, 2013

Related U.S. Application Data

(60) Provisional application No. 61/608,995, filed on Mar. 9, 2012.

(51) Int. Cl.
*G09F 13/04* (2006.01)
*G02B 5/04* (2006.01)
(Continued)

(52) U.S. Cl.
CPC ............. *G02B 5/045* (2013.01); *G02B 3/08* (2013.01); *G02B 27/1066* (2013.01);
(Continued)

(58) Field of Classification Search
CPC ... G02F 1/133606; G02F 2001/133562; G02F 2001/133388; G02F 2001/133391;
(Continued)

(56) References Cited

U.S. PATENT DOCUMENTS 5,061,052 A   10/1991  DeJesus ..................... 359/742
5,400,177 A    3/1995  Petitto et al. ............... 359/451
(Continued)

FOREIGN PATENT DOCUMENTS

CN    101526688 A    9/2009
EP       2439482     5/2010  ............ G02F 1/335
(Continued)

OTHER PUBLICATIONS

Chinese First Office Action 201280056916.8 Dated Apr. 29, 2016.
International Search Report and Written Opinion PCT/US2012/059649 Dated Dec. 19, 2012.

*Primary Examiner* — Jong-Suk (James) Lee
*Assistant Examiner* — James Endo
(74) *Attorney, Agent, or Firm* — Kevin M. Able

(57) ABSTRACT

Bezel-concealing display covers and display devices are disclosed. In one example, a bezel-concealing display cover includes a bezel and a display panel includes a perimeter portion having a first surface and a second surface such that the perimeter portion is configured to be offset from the bezel of the display device by a gap $G_A$. The bezel-concealing display cover further includes a first array of prisms on at least one of the first surface or the second surface of the perimeter portion that extend from an edge of the perimeter portion to a distance L. Each prism of the first array of prisms has a prism angle $\theta$, and the first array of prisms is configured to shift a portion of an image proximate the bezel produced by the display panel such that the shifted portion of the image appears over the bezel to an observer.

10 Claims, 19 Drawing Sheets

(51) Int. Cl.
*G02B 3/08* (2006.01)
*G02B 27/10* (2006.01)
*G02B 27/12* (2006.01)
G02F 1/1335 (2006.01)
G02F 1/1333 (2006.01)
G06F 3/14 (2006.01)

(52) U.S. Cl.
CPC ........... *G02B 27/126* (2013.01); *G09F 13/04* (2013.01); *G02F 1/13336* (2013.01); *G02F 1/133526* (2013.01); *G02F 2001/133388* (2013.01); *G02F 2001/133391* (2013.01); *G02F 2001/133562* (2013.01); *G06F 3/1446* (2013.01); *G09G 2300/026* (2013.01)

(58) Field of Classification Search
CPC .......... G02F 1/133526; G02F 1/13336; G09F 13/04; G09F 9/3026; G09F 9/3023; G09F 9/35; G02B 3/08; G02B 27/126; G02B 5/045; G02B 27/1066; F21V 5/04; G09G 2300/026; G06F 3/1446
USPC .... 345/1.3, 905; 359/625, 454, 837; 349/58, 349/73, 57; 362/633, 634, 340, 339, 97.1, 362/97.2, 97.3, 97.4
See application file for complete search history.

(56) References Cited

U.S. PATENT DOCUMENTS

| | | | |
|---|---|---|---|
| 5,739,880 A | 4/1998 | Suzuki et al. | 349/110 |
| 5,828,410 A | 10/1998 | Drapeau | 348/383 |
| 6,129,439 A * | 10/2000 | Hou et al. | 362/626 |
| 6,313,946 B1 | 11/2001 | Petitto et al. | 359/451 |
| 6,407,860 B1 * | 6/2002 | Funazaki et al. | 359/457 |
| 6,724,535 B1 * | 4/2004 | Clabburn | 359/619 |
| 6,919,678 B2 | 7/2005 | Ozolins et al. | 313/479 |
| 6,927,908 B2 | 8/2005 | Stark | 359/449 |
| 7,222,969 B2 | 5/2007 | Veligdan | 353/37 |
| 7,414,594 B2 * | 8/2008 | Kim et al. | 345/1.3 |
| 7,551,372 B2 | 6/2009 | Xun et al. | 359/737 |
| 7,567,380 B2 | 7/2009 | Peterson et al. | 359/449 |
| 7,719,745 B2 | 5/2010 | Yamada | 359/245 |
| 7,724,432 B2 | 5/2010 | Destain et al. | 359/449 |
| 7,777,949 B2 | 8/2010 | Peterson et al. | 359/455 |
| 7,826,135 B2 | 11/2010 | Destain et al. | 359/449 |
| 7,931,377 B2 | 4/2011 | Shinozaki et al. | 353/94 |
| 7,942,531 B2 | 5/2011 | Whitehead et al. | 353/30 |
| 8,023,194 B2 | 9/2011 | Kwon et al. | 359/625 |
| 8,040,601 B1 | 10/2011 | St. Hilaire | 359/443 |
| 8,045,068 B2 | 10/2011 | Kim et al. | 348/842 |
| 8,045,272 B2 | 10/2011 | Park et al. | 359/625 |
| 8,073,289 B2 | 12/2011 | Miller | 382/284 |
| 8,421,708 B2 * | 4/2013 | Han | 345/1.3 |
| 8,531,351 B2 * | 9/2013 | Choi | 345/1.3 |
| 9,244,282 B2 | 1/2016 | Etienne et al. | |
| 2002/0097358 A1 | 7/2002 | Ueki et al. | |
| 2003/0231144 A1 * | 12/2003 | Cho et al. | 345/1.3 |
| 2004/0240061 A1 * | 12/2004 | Kouno | 359/566 |
| 2005/0162583 A1 | 7/2005 | Ozolins et al. | 349/58 |
| 2006/0077544 A1 * | 4/2006 | Stark | 359/448 |
| 2006/0158579 A1 | 7/2006 | Hasegawa | 349/58 |
| 2006/0198033 A1 | 9/2006 | Soyama et al. | 359/742 |
| 2007/0103854 A1 | 5/2007 | Yu et al. | 361/681 |
| 2007/0291203 A1 | 12/2007 | Nakahara et al. | 349/113 |
| 2008/0158796 A1 | 7/2008 | Hine | |
| 2008/0212338 A1 | 9/2008 | Kohara et al. | 362/606 |
| 2009/0103191 A1 * | 4/2009 | Xun et al. | 359/742 |
| 2009/0109366 A1 | 4/2009 | Lippey | 349/58 |
| 2009/0207096 A1 * | 8/2009 | Lee et al. | 345/1.3 |
| 2009/0231524 A1 | 9/2009 | Tanaka | 349/110 |
| 2009/0322982 A1 | 12/2009 | Finnegan | 349/58 |
| 2010/0079696 A1 * | 4/2010 | Hwu et al. | 349/57 |
| 2010/0097447 A1 * | 4/2010 | Tomisawa et al. | 348/51 |
| 2010/0107463 A1 * | 5/2010 | Spiro | 40/546 |
| 2010/0232026 A1 | 9/2010 | Park et al. | 359/625 |
| 2010/0232027 A1 | 9/2010 | Park et al. | 359/625 |
| 2010/0238090 A1 * | 9/2010 | Pomerantz et al. | 345/1.3 |
| 2010/0246104 A1 | 9/2010 | Park et al. | 361/679.01 |
| 2010/0259274 A1 | 10/2010 | Lee et al. | 359/609 |
| 2010/0259566 A1 * | 10/2010 | Watanabe | 345/690 |
| 2010/0259828 A1 | 10/2010 | Byeon et al. | 359/609 |
| 2010/0259829 A1 | 10/2010 | Kim et al. | 359/609 |
| 2010/0277665 A1 * | 11/2010 | Kuo et al. | 349/58 |
| 2010/0315570 A1 | 12/2010 | Mathew et al. | 349/58 |
| 2011/0025594 A1 * | 2/2011 | Watanabe | 345/102 |
| 2011/0075065 A1 | 3/2011 | Ozolins et al. | 340/58 |
| 2011/0080723 A1 * | 4/2011 | Kaluzhny | 362/84 |
| 2011/0102302 A1 * | 5/2011 | Watanabe et al. | 345/4 |
| 2011/0109535 A1 * | 5/2011 | Watanabe et al. | 345/87 |
| 2011/0215990 A1 * | 9/2011 | Liesenberg | 345/1.3 |
| 2011/0242686 A1 * | 10/2011 | Watanabe | 359/804 |
| 2011/0255301 A1 * | 10/2011 | Watanabe | 362/558 |
| 2011/0285934 A1 * | 11/2011 | Watanabe | 349/58 |
| 2012/0049718 A1 * | 3/2012 | Watanabe et al. | 313/110 |
| 2012/0139964 A1 * | 6/2012 | Han et al. | 345/690 |

FOREIGN PATENT DOCUMENTS

| | | | |
|---|---|---|---|
| EP | 2360662 | 8/2011 | G09F 9/40 |
| JP | 2003-215304 | 7/2003 | G02B 1/11 |
| JP | 2005-166811 | 6/2005 | H05K 9/00 |
| JP | 2005-242265 | 8/2005 | G09F 9/00 |
| JP | 2005-128421 | 5/2006 | H05K 9/00 |
| JP | 2006-179683 | 6/2006 | H05K 9/00 |
| KR | 10-0817560 | 3/2008 | H01J 17/49 |
| KR | 10-0841318 | 6/2008 | G02F 1/1335 |
| KR | 10-2008-0106604 | 9/2008 | H01J 17/16 |
| WO | WO 02/27399 | 4/2002 | G03B 21/60 |
| WO | WO 2010/140537 | 12/2010 | G02F 1/3335 |
| WO | WO 2012/025471 | 3/2012 | G02F 1/13 |

* cited by examiner

Prism angle decreases →

.2mm

BEZEL-CONCEALING DISPLAY COVERS AND DISPLAY DEVICES

CROSS-REFERENCE TO RELATED APPLICATIONS

This application claims the benefit of priority under 35 U.S.C. §119 of U.S. Provisional Application Ser. No. 61/608,995 filed on Mar. 9, 2012 and Provisional Application Ser. No. 61/546,296 filed on Oct. 12, 2011 the content of which is relied upon and incorporated herein by reference in its entirety.

TECHNICAL FIELD

The present disclosure relates to bezel-concealing display covers for display devices, such as televisions, and bezel-free display devices.

BACKGROUND

As used herein, the term display device is intended to encompass all devices capable of displaying visual content, including, but not limited to, computers, including laptops, notebooks, tablets and desktops; mobile telephones, and; televisions (TV). Each of the foregoing devices include many component parts, including the physical case or cabinet in which individual components may reside, circuit boards, circuit elements such as integrated electronic components, and of course the display panel itself Currently, these display panels are flat display panels comprising liquid crystal display elements, organic light emitting diode (OLED) display elements, or plasma display elements, and of course the glass or plastic substrates on which many of these elements are disposed and/or enclosed by. Typically, the edge portions of the flat display panels and the display device itself are utilized for electrical leads and various other electronic components associated with the operation of the display panel, such as circuits that drive the panel pixels as well as LED illuminators in the case of a LCD display panel. This has resulted in flat display panel manufacturers encasing the edge portions within and/or behind a bezel, which serves to conceal the foregoing components, but also obscures the edge portions of the display panel thereby reducing the overall image size.

For aesthetic reasons, flat panel display makers are trying to maximize the image viewing area and provide a more aesthetically pleasing appearance, and accordingly minimize the size of the bezel surrounding the image. However, there are practical limits to this minimization, and current bezel sizes are in the order of 3 mm to 10 mm in width. Therefore, to achieve the ultimate goal of no bezel at all, an optical solution has been proposed that will give the observer the impression that the image is occupying the entire panel surface while simultaneously reducing a gap between the image-forming display panel and a display cover.

SUMMARY

Generally, embodiments described herein are directed to bezel-concealing display covers that provide a substantially bezel-free appearance to a display device. The bezel-concealing display device shifts portions of an image that are close to the bezel of the display device such that those portions appear over the bezel to an observer, thereby minimizing the appearance of the bezel.

In one aspect, a bezel-concealing display cover for coupling to a display device including a bezel and a display panel includes a perimeter portion having a first surface and a second surface such that the perimeter portion is configured to be offset from the bezel of the display device by a gap $G_A$. The bezel-concealing display cover further includes a first array of prisms on at least one of the first surface or the second surface of the perimeter portion that extend from an edge of the perimeter portion to a distance L. Each prism of the first array of prisms has a prism angle $\theta$, and the first array of prisms is configured to shift a portion of an image proximate the bezel produced by the display panel such that the shifted portion of the image appears over the bezel to an observer. In some examples the gap $G_A$ may be in a range from about 2 to 5 times the width W of the bezel. The display panel in the case of an LCD display panel may further include, without limitation, thin film transistors, polarizing films, color filter films, transparent conductive films such as ITO (indium tin oxide), antireflection films, spacer elements, and alignment films. The perimeter portion may be made of glass, for example. The first array of prisms may be integrated into the glass, or provided by an angular filter. The first array of prisms may be positioned on the first surface of the perimeter portion such that the first surface faces the observer. In other examples, the first array of prisms may be positioned on the second surface of the perimeter portion such that the second surface of the perimeter portion faces the display device.

For example, L may equal $W+G_A\tan(\gamma)$ where $\gamma$ is a maximum angle at which the bezel cannot be viewed. In some examples, each prism of the array of prisms has a prism angle $\theta$ defined as the angle between the entrance facet and the output facet through which the predominant light ray(s) from the display panel enter and/or emerge, excluding extraneous light such as light occurring as a result of multiple internal reflections (such as ambient light). The prism angles of the array of prisms decrease in a direction from the perimeter edge of the display cover toward the central region of the display cover. The prism angles of the array of prisms may decrease linearly. Alternatively, the prism angles of the array of prisms may decrease nonlinearly. In some examples, prism angles of individual prisms of the array of prisms decrease from an angle $\theta_1$ between about 45° and about 60° to zero over the distance L.

The prisms of the first prism array may be positioned on the first surface of the perimeter portion of the display cover. In some examples, a second array of prisms may be positioned on the second surface of the perimeter portion of the display cover. In some examples, the bezel-concealing display cover further includes a substantially transparent central region bounded by the perimeter portion.

In some examples, each individual prism of the first array of prisms has a transiting facet and a non-transiting facet. The transiting facet is transmissive to light produced by the display device, and the non-transiting facet is opaque. In some examples, the first array of prisms forms a Fresnel lens. For example, the Fresnel lens may be aspheric in some examples.

In another aspect, a display device includes a display cover, a backlight, a display panel, and a bezel having a width W disposed about a perimeter edge of the display panel. In some examples, the display cover includes a perimeter portion and a central region bounded by the perimeter portion, a first surface and a second surface, and a first array of prisms disposed on at least one of the first surface or the second surface. The first array of prisms extends from an edge of the display cover toward the central region of the display cover to a distance L. The display panel is positioned between the backlight and the display cover such that a gap $G_A$ is present between the display panel and the second surface of the display cover, wherein the display panel is configured to display an image.

In yet another aspect, a display device includes a display cover, a backlight, a display panel, and a bezel having a width W disposed about a perimeter edge of the display panel. In some examples, the display cover includes a perimeter portion and a central region bounded by the perimeter portion, a first surface and a second surface, and an array of prisms disposed on at least one of the first surface or the second surface. The array of prisms extends from an edge of the display cover toward the central region of the display cover to a distance L. In some examples, prism angles of individual prisms of the array of prisms decrease from an angle $\theta_1$ between about 45° and about 60° to zero over the distance L. The display panel is positioned between the backlight and the display cover such that a gap $G_A$ is present between the display panel and the second surface of the display cover, wherein the display panel is configured to display an image. The distance L is at least two times the width W of the bezel, and the gap $G_A$ is between about 2 to about 5.5 times the width W of the bezel.

BRIEF DESCRIPTION OF THE DRAWINGS

These and other aspects are better understood when the following detailed description is read with reference to the accompanying drawings, in which.

DETAILED DESCRIPTION

Figure 1A:
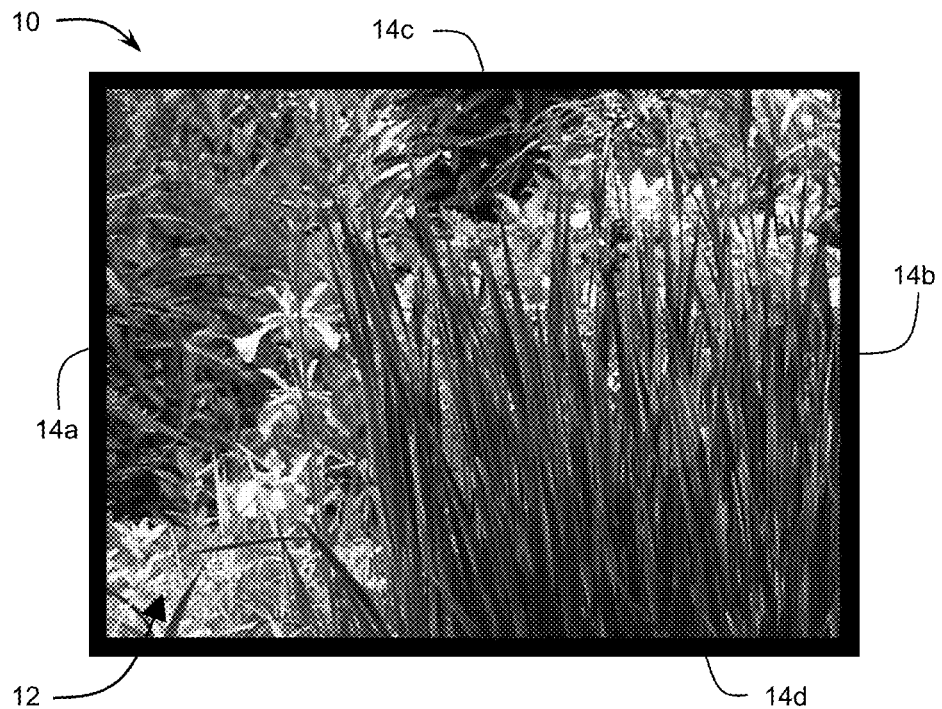
FIG.1A is a front view of a display device comprising a display panel and a bezel.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

The aesthetics of display devices, such as television display panels, computer monitors, and laptop display panels, are affected by the size and appearance of a bezel that exists around a perimeter of such display devices. The bezel of a display device may be used, for example, to house electronics for driving the pixels of the display panel, as well as, in certain instances, to provide backlighting for the display device. For example, an LCD television display panel may include a plurality of backlighting light emitting diodes (LEDs) maintained within the bezel region of the display device.

The trend over the last few years has been toward smaller and smaller bezels. Current bezel widths are in the order of 3.0 mm to 10 mm. However, television models having very large display panels have achieved bezel regions having a width as small as 2 mm on at least two borders, and 4 mm on the other two borders. However, the presence of a bezel, even though small, is still distracting, especially when the display devices are assembled in a tiled arrangement to form a very large displayed image. The bezels of such tiled display devices give the undesirable appearance of an image "grid," rather than a cohesive large image without seams. The eye is very sensitive to the presence of a black line separating tiled display devices, which makes such an image unsightly.

Embodiments of the present disclosure include bezel-concealing display covers that conceal the bezel so that its presence is not visible, or at the least not noticeable to the observer within a predictable viewing angle. Such display covers can be formed from glass, for example. In some embodiments the glass can be a chemically strengthened glass.

Figure 1B:
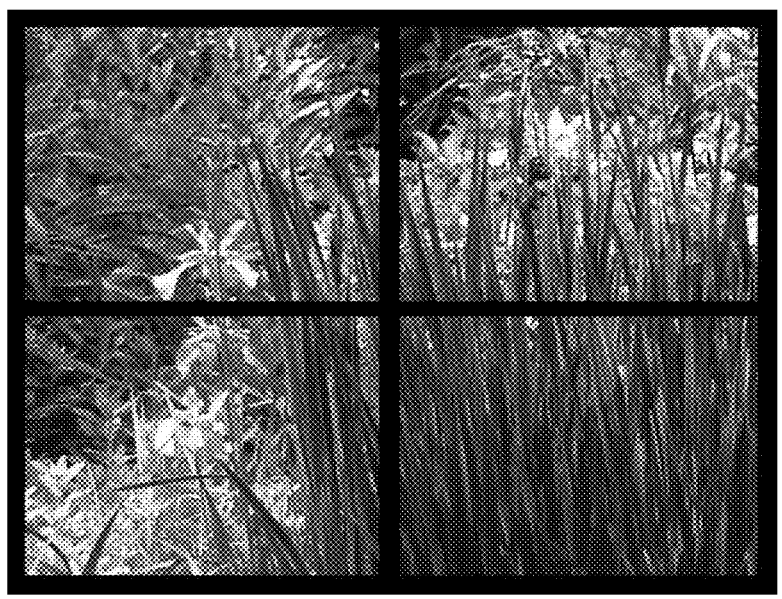
FIG.1B is a front view of a tiled array of display devices.

Referring now to FIG.1A, a display device 10 configured as a flat display panel television is illustrated. While the following description is primarily in terms of televisions, it should be noted that embodiments described herein may be suitable for other display devices and therefore the described embodiments are not limited to televisions. Display device 10 comprises a display panel 12 that has a bezel 14 positioned around its perimeter. Bezel 14 comprises bezel portions 14a-14d. The bezel portions 14a-14d may enclose display drive electronics, as well as backlighting hardware to backlight the display panel portion 12, such as edge light emitting diodes (LEDs). The bezel portions 14a-14d may have a particular width, such as between 3 mm and 10 mm, for example. The bezel portions 14a-14d may be distracting to a viewer, particularly if several display devices are arranged in a matrix in order to view the entire image, as illustrated in FIG.1B.

Figure 2:
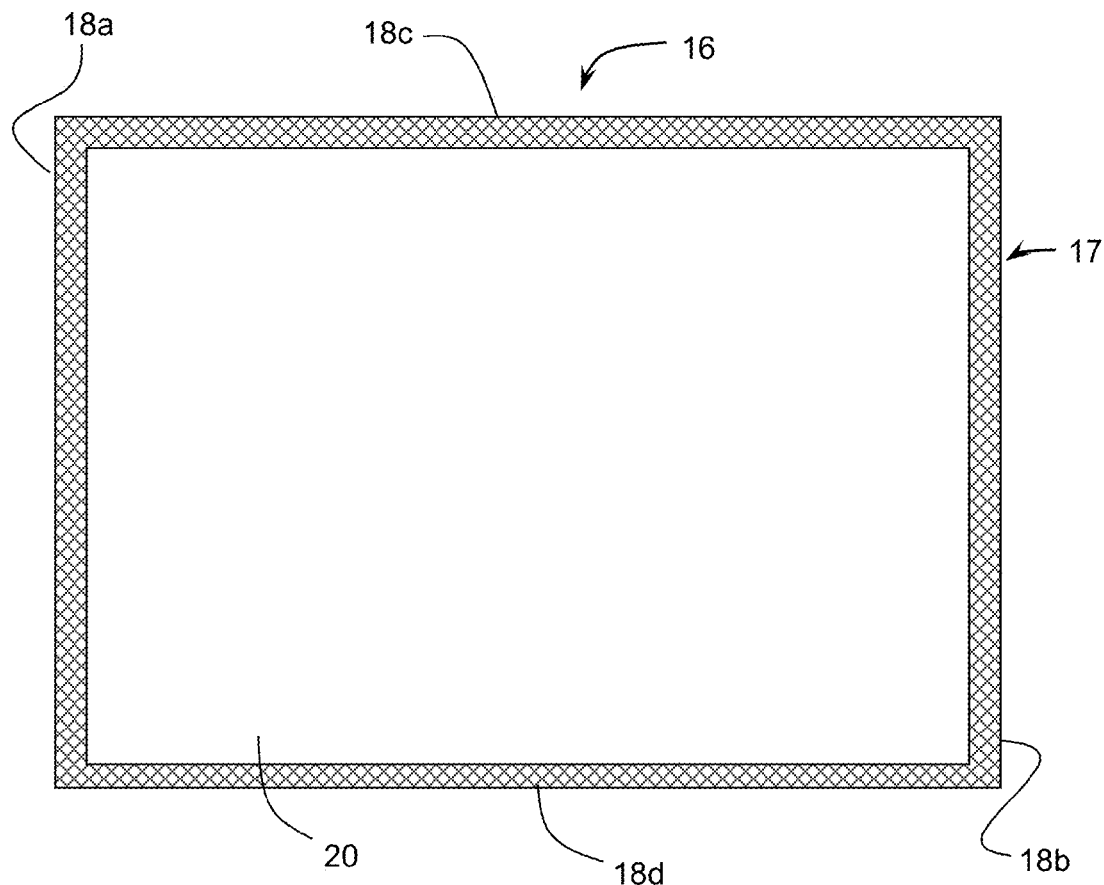
FIG.2 is a front view of a display cover including prism regions for concealing a bezel.

FIG.2 schematically depicts a bezel-concealing display cover 16 according to one embodiment. The bezel-concealing display cover 16 of the illustrated embodiment is configured to be mechanically coupled to a display device (e.g., a display device 10 as illustrated in FIG.1A). The bezel-concealing display cover 16 should be mounted on the display device 10 such that there is a gap (e.g., a low index gap or an air gap) between the bezel-concealing display cover 16 and the surface of the display device 10. In one embodiment, the bezel-concealing display cover 16 is coupled to the display device 10 by transparent pillars (not shown) at the corners of the bezel-concealing display cover 16.

The bezel-concealing display cover 16 may, for example, comprise a perimeter portion 17 including four prism portions 18a-18d adjacent to the perimeter of the display cover. As described in more detail below, prism portions 18a-18d comprise many prisms arranged in an array that act as a light bending (refracting) filter to the regions of the display panel 12 that are positioned behind the bezel portions 14a-14d relative to the observer. The display cover and the light bending filters provided by the prism portions 18a-18d make it possible to conceal the bezel so that its presence is not visible, or at least not readily apparent to the observer within a predictable viewing angle.

In some embodiments, the bezel-concealing display cover 16 may further comprise a visually transparent central region 20 bounded by the prism portions 18a-18d that does not contain any prisms and is therefore substantially flat. In other embodiments, the bezel-concealing display cover 16 does not include a central region such that only a frame defined by the perimeter portion 17 is provided.

The bezel-concealing display cover 16 may be made of glass. For example, the glass may be a chemically strengthened glass such as an ion exchanged glass, an acid-washed glass, or both. Prism portions 18a–18d may, for example, be made from a commercially available light bending filter material that can be adhered to the display cover, such as VIKUITI image directing film (IDF II) manufactured by the 3M Company. It should be understood that VIKUITI is but one of many possible light bending filter solutions, and is presented herein as a non-limiting example only. In another example, light bending filters may be incorporated directly into display cover 16. For example, prisms may be formed directly in the display cover material. As described in more detail below, specialized light bending filters may be optimized and developed for the purpose of concealing the bezel from an observer. It is noted that a gap of approximately 2.7 times the desired lateral image shift may be needed when using the VIKUITI light bending filter.

In another embodiment, the prisms can also be part of a frame surrounding the display and made of a transparent material such as plastic or glass. The frame can be produced, for example, by injection molding and the mold itself can include the microprism structure necessary to produce the desired optical effect. In such embodiments, the central region 20 may be free space.

Figure 3A:
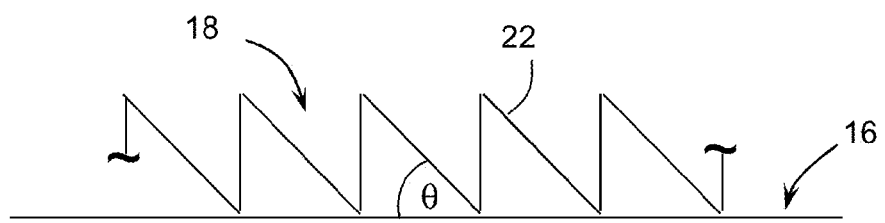
FIG.3A is a schematic diagram of a portion of a prism region showing individual prisms.
Figure 3B:
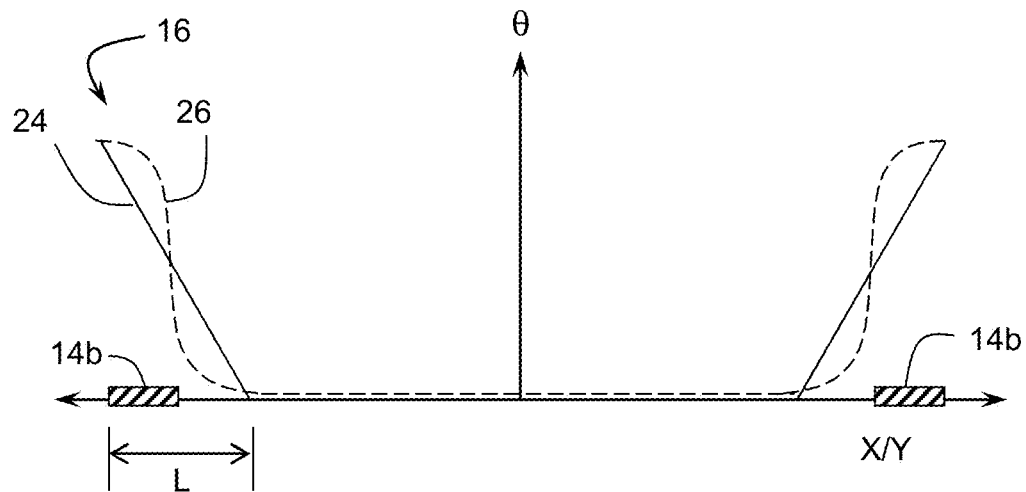
FIG.3B is a graph showing the prism angle θ as a function of position on a display device.

Referring now to FIG.3A, a portion of a prism region 18 positioned on a bezel-concealing display cover 16 is illustrated. The prism portion 18 comprises many prisms 22 that are triangularly shaped. The prisms 22 are positioned on an outside surface of the display cover 16 (facing an observer) in the figure. The prisms 22 include a prism angle $\theta$ that cause the image near the bezel to be shifted, wherein the prism angle is the angle bounded by the faces (facets) of the prism through which light predominantly transits the prism. FIG.3B is a graph showing the prism angle $\theta$ as a function of position on the display device 10. Generally, the angle $\theta$ of the prisms 22 should be at a maximum at the edge of the bezel-concealing display cover 16 and fall to zero (i.e., no prisms at all) away from the edges of the display cover. Accordingly, only a small portion of the image produced by display panel 12 will be shifted. The frequency of the array of prisms, that is the periodicity of the prisms, should be greater than the frequency of the pixels of the display panel to prevent aliasing in the resulting image. Generally, the prisms should have a size that is smaller than the pixels of the display panel. For example, the individual prisms may be as small as 1/10 the size of a single pixel of the display panel.

Solid curve 24 depicts an example in which the angle $\theta$ of the prisms decreases linearly from the edges of the bezel-concealing display cover 16 and falls to zero at the central region over a distance L. Dashed curve 26 depicts an example in which the angle $\theta$ of the prisms vary non-linearly over distance L. The more complicated profile of dashed curve 26 may be considered with the aim of avoiding disturbing image discontinuities.

Figure 4:
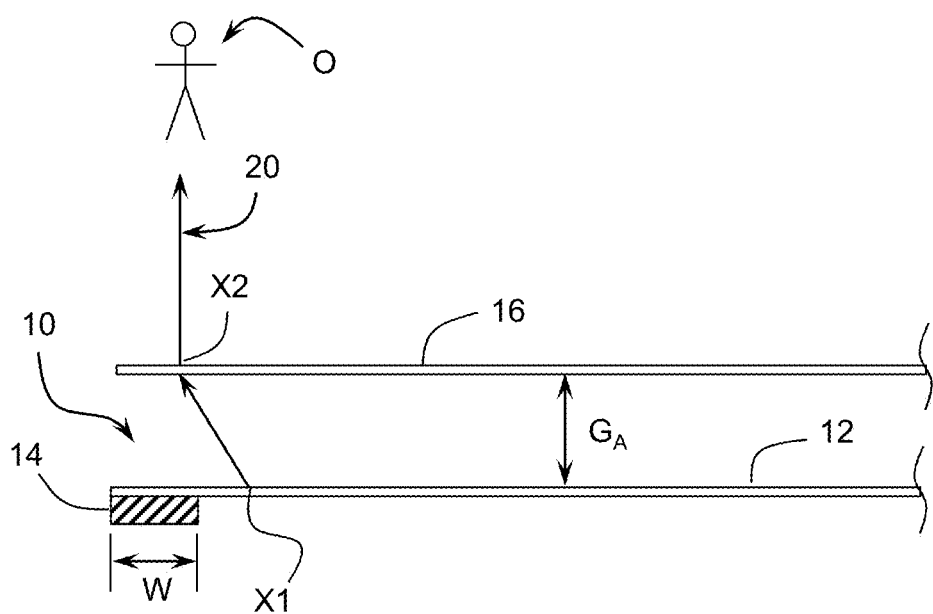
FIG.4 schematically illustrates an observer located far away from a display panel of a display device that is covered with a bezel-concealing display cover.

FIG.4 schematically illustrates an observer O located far away from a display panel 12 of a display device 10, wherein a bezel-concealing display cover 16 is positioned between the display panel and the observer O. A gap $G_A$ exists between the bezel-concealing display cover 16 and the display panel 12. The simulation traces light rays emitted from the display panel 12 to the observer O and indicates, for a given position X1 on the display panel 12, the position X2 where the light ray hits the bezel-concealing display cover 16. In one simulation, the prisms face the observer O, and the prism angle of the prisms vary linearly from 32° at the very edge of the bezel-concealing display cover 16 (i.e., above a portion of bezel 14), to 0° about 10 mm away from the outer edge of display cover 16. The index of refraction of the bezel-concealing display cover 16 in the simulation was 1.5, and the gap $G_A$ was about 15 mm.

Figure 5:
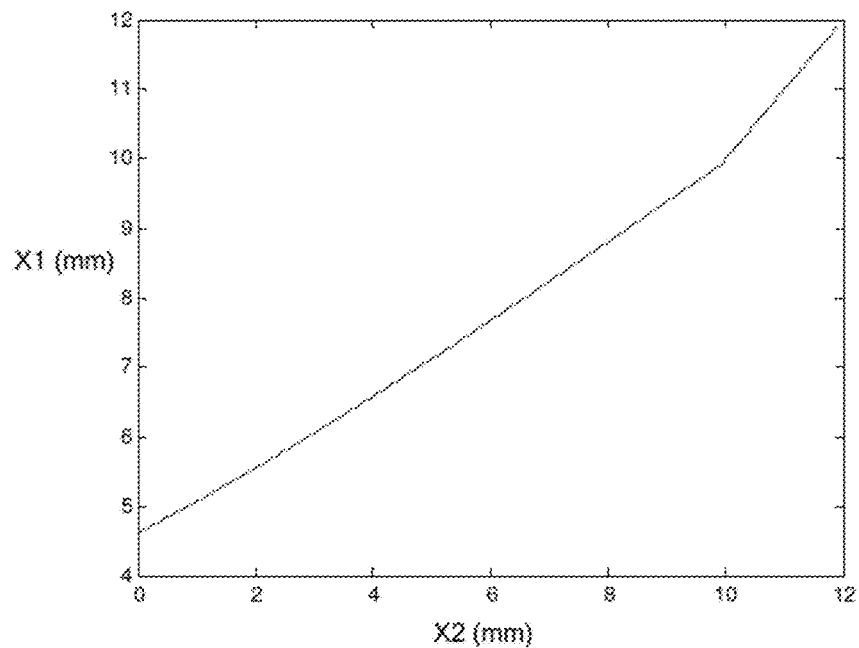
FIG.5 is a plot of a position on the display device versus a position on the bezel-concealing display cover.

FIG.5 is a graph of simulation results showing that, at the very edge of the bezel-concealing display cover 16 (X2=0), the position X1 on the display panel 12 of the display device 10 seen by the observer O is about 4.8 mm away from the edge of the display screen 13. Accordingly, the bezel 14 will be invisible to an observer if the size (width) is smaller than 4.8 mm.

Figure 6:
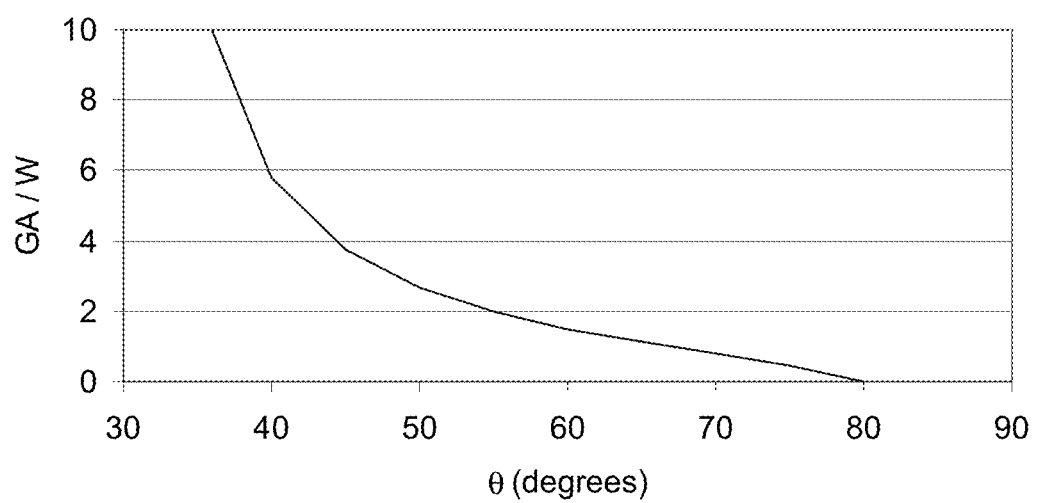
FIG.6 is a plot of the ratio of gap distance D to bezel width W as a function of prism angle θ.

The amount of beam deviation that can be produced by a prism is a function of the angle θ of the prism. The graph depicted in FIG.6 shows the ratio of gap $G_A$ to bezel width W as a function of prism angle θ assuming a refractive index of 1.5 and further assuming the bezel is to remain essentially invisible for a viewing angle of 20°. As an example and not a limitation, by using a prism angle θ of 45 degrees, the gap needs to be at least 4 times the width of the bezel (a $G_A/W$ ratio of 4).

Introduction of the bezel-concealing display covers described herein may introduce artifacts and/or distortions in the image displayed by the display device that may be visible to an observer. Described below are several image artifacts that may be introduced, as well as design parameters that may be optimized to minimize the appearance of such image artifacts and/or distortions.

Figure 12:
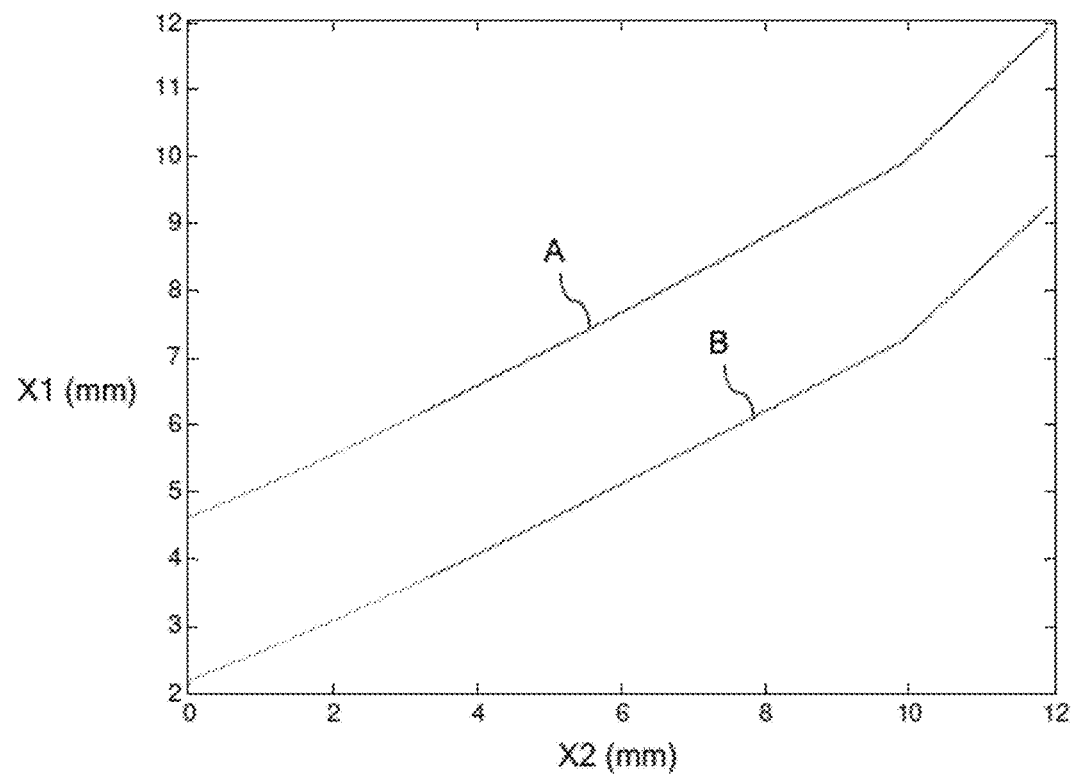
FIG.12 is a plot of a position on the display device versus a position on the bezel-concealing display cover for a viewing angle at normal incidence and for a viewing angle at 10°.

The localized light bending filters provided by the preceding examples of a bezel-concealing display cover 16 near the bezel of a display device, such as display device 10, may produce local image magnification. A first impact of that local magnification is to introduce image deformation that can be compensated in part by using image distortion correction algorithms. Image distortion correction algorithms may manipulate the image displayed by the display panel 12 to minimize the appearance of magnification. However, because the distortion in the image is a function of the viewing angle γ (e.g., as shown in FIG. 12), the image can only be compensated for a given angle of vision (e.g., when the display is being viewed at normal incidence or some other static viewing angle γ).

Figure 7:
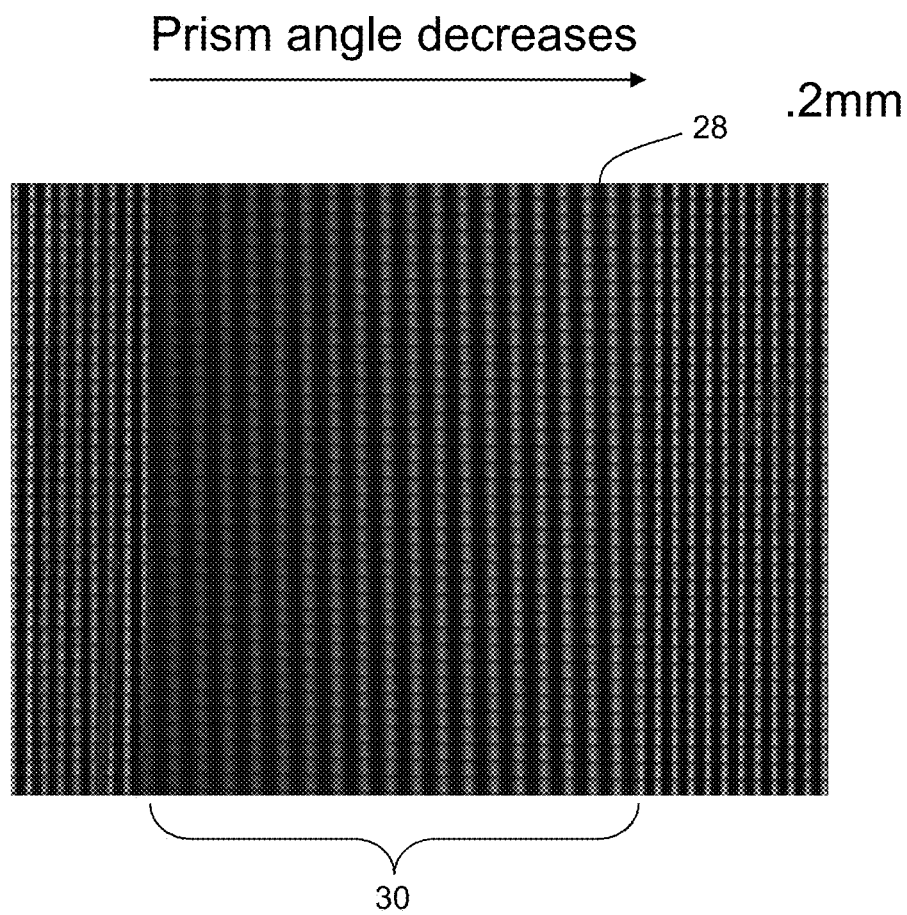
FIG.7 is a view of an image as seen through a portion of a display cover comprising prisms, and showing localized image magnification (banding) at the prism location.

Another image artifact related to local magnification is that the image of individual pixels may be highly magnified, resulting in the introduction of colored or black bands into the image. FIG.7 illustrates the case where the image is locally magnified by using a varying angle prism structure placed in front of a pixilated screen. Due to the magnification, broad dark 28 bands within region 30 resulting from the space between the pixels is highly magnified, thereby resulting in visibly noticeable black lines in the image. This effect is referred to as "banding".

Figure 8:
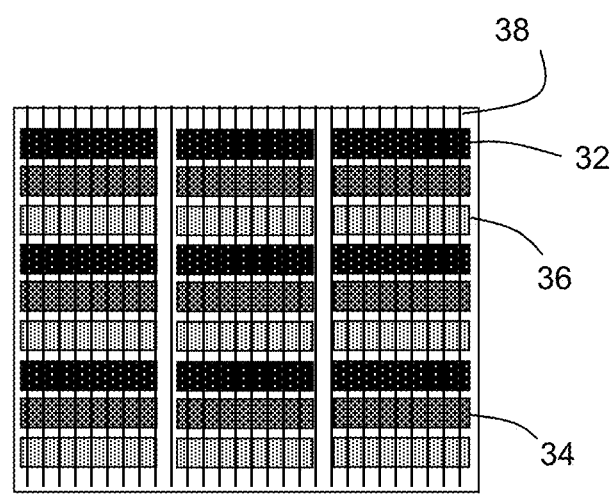
FIG.8 is a schematic view of an array of red, green, and blue (RGB) pixels wherein the pixels are arranged orthogonal to the long axis of the prisms of the prism array to reduce banding.
Figure 9:
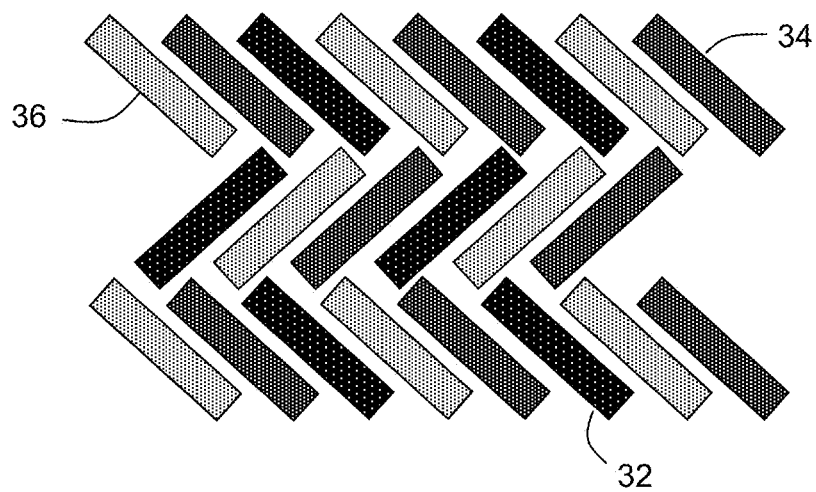
FIG.9 is a schematic view of an array of RGB pixels arranged to reduce banding.

As an example, banding may be reduced or eliminated by minimizing the space between pixels of the same color. FIG.8 depicts an example where the red, green and blue pixels (32, 34 and 36, respectively) of the display panel 12 are aligned orthogonal to the long axis 36 direction of the prisms. Another approach is depicted in FIG.9. This approach comprises aligning the pixels (e.g., the red, green and blue pixels, 32, 34 and 36, respectively) at a large angle with respect to one another (e.g., approximately 45 degrees) and shifting the colors every other line. In that case, the colored or black bands are shifted every other line and therefore become less visible.

Additionally, the size of the individual pixels may be manipulated to minimize the effects of magnification. A typical single pixel size in a large display, such as a 55" diagonal display, is about 0.7 mm, depending on the resolution, meaning that at a magnification factor of 5, the pixels are readily visible. This can be avoided by making the pixels of the display panel smaller or to have different geometries. For a magnification factor of 5, utilizing sub-pixels that would be 5 times smaller would eliminate perceived banding. From an electronic point of view, each set of sub-pixels may still be driven by the same transistor, thereby avoiding more complex electronic circuitry.

Figure 10:
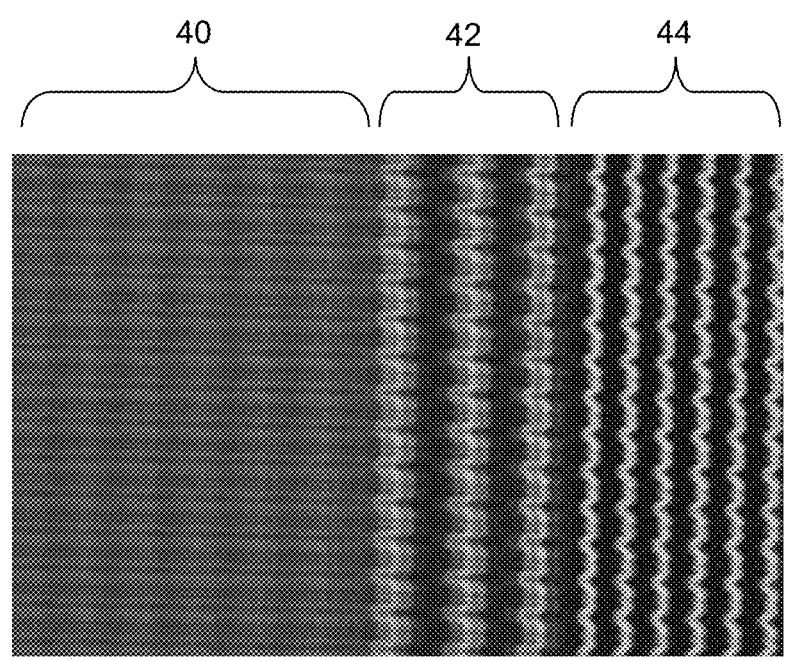
FIG.10 is a view of a portion of an image as seen through a display cover comprising prisms, showing a portion with no prisms, a portion with prisms but without localized blurring and a portion with prisms and localized blurring.
Figure 11:
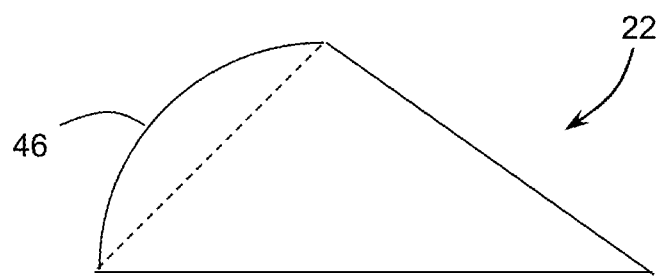
FIG.11 is a schematic view of a prism comprising a curved front facet.

The bezel-concealing display cover may also be modified to reduce or eliminate banding. For example, banding may be reduced or eliminated by making the image of single pixels slightly blurry by introducing a roughness on the facets of the prisms, or by making those surfaces slightly curved instead of flat (i.e., adding a lens component to the prism). Suitable roughness can be obtained, for example, by diamond turning technology for creating a master and micro replication of the master. FIG.10 depicts an image where a portion 40 of the prisms had curvature (partly blurred zone), and another portion 42 wherein the prisms had only flat facets (no blurring zone). As can be seen, the broad dark lines between the pixels are eliminated in portion 42. Portion 44 is seen without prisms. FIG.11 is a schematic illustration of a prism 22 comprising a curved front facet 46.

When the observer does not view the display device 10 at normal incidence, the bezel 14 may be partly or wholly visible to the observer. Particularly, when the observer O is located very close to the display device 10, the observer will view all of the edges of the display cover at high angles of incidence, which may make all of the bezel portions visible and may give an impression, for example, of a television inside a box.

FIG.12 is a graph that depicts simulation results regarding the position seen on the display device 10 in the same conditions as shown in FIG.4 looking at the display device 10 at normal incidence (curve A), and similar conditions as shown in FIG.6 with a 10° incidence angle (curve B, α=10). As shown in the graph, curves A and B are similar except that they are shifted with respect to one another. In first approximation, curve B is shifted by AG*sin(α), where AG is the air gap and a is the angle of vision. Therefore, at a relatively small viewing angle (e.g., 10°), the bezel will start to become visible. It is noted that the prism angles may be varied non-linearly to provide for larger viewing angles (see dashed curve 26 of FIG.3B).

In some embodiments, a reduction in the visibility of the bezel at an increased viewing angle may be accomplished by adding a diffusing texture on the prism portions 18a-18d of the bezel-concealing display cover 16. The image may be partially blurred in this region close to the bezel portions 14a-14d because that part of the image is generated on the bezel-concealing display cover 16. However, having a 10 mm blurred area for a large television may not be a significant visual distraction because observers usually fix their attention near the center of the image, and peripheral information is not as significant. In some examples, prism portions 18a-18d may have prisms on each side of the bezel-concealing display cover 16 to enlarge the viewing angle.

Figure 13:
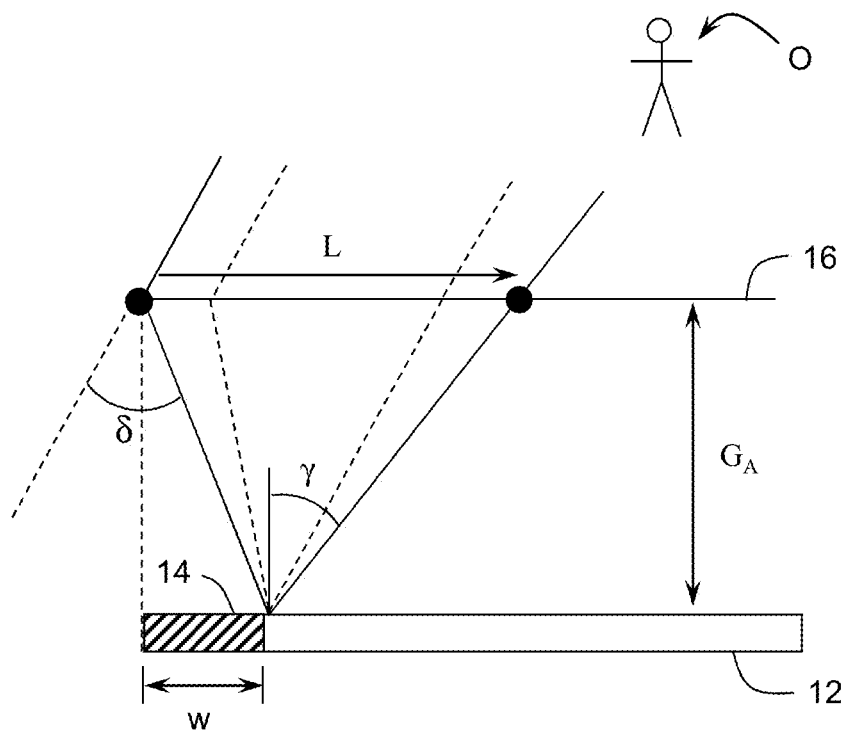
FIG.13 is a schematic view of a display panel and bezel, and a display cover comprising an array of prisms distributed over a length L from an edge of the display cover.

Referring now to FIG.13, consider that the observer O is looking at the display device 10 (e.g., a television) at a viewing angle of γ relative to a normal to display panel 12. To ensure bezel 14 is not seen at viewing angle γ, the deviation angle δ introduced by prisms 22 positioned on display cover 16 needs to be:

$$\delta = \gamma + \arctan(W/G_A)$$

or $$G_A = W/\tan(\delta - \gamma) \quad (1)$$

where δ is the prism deviation angle, γ is the viewing angle, W is the bezel width, and $G_A$ is the distance of the gap between display panel 12 and display cover 16. FIG.13 also shows that the minimum distance L over which prisms should be positioned extending from the edge of the display cover toward an interior of the display cover is:

$$L = W + G_A \tan(\gamma) \quad (2)$$

Figure 14:
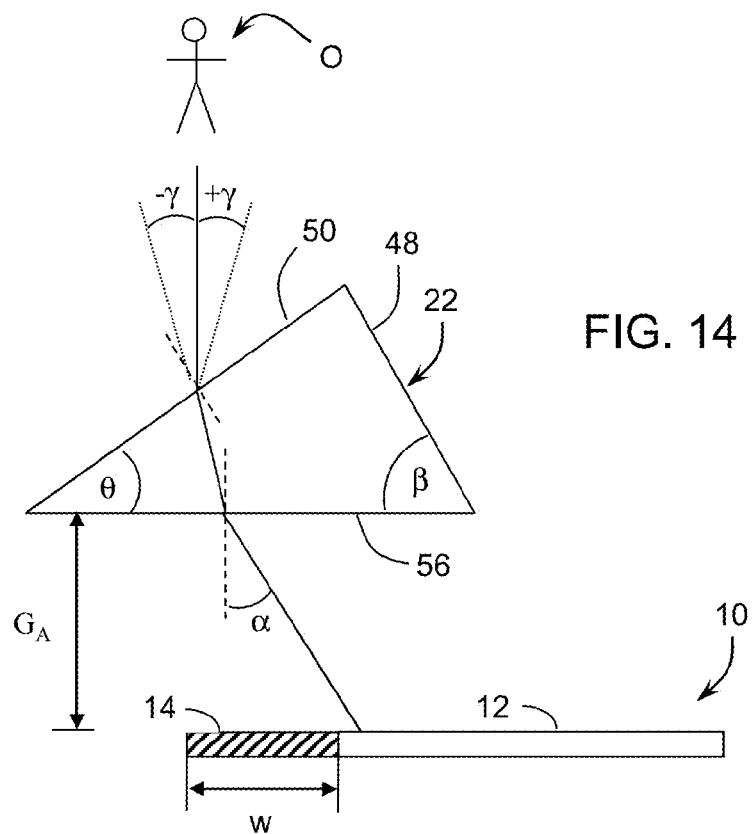
FIG.14 is a schematic view of a display panel and bezel, and a single prism of the array of prisms of FIG.13 illustrating positive and negative viewing angles and gap $G_A$.

Equation 1 shows that gap $G_A$ will decrease as the prism deviation angle δ is increased or the viewing angle γ is decreased, meaning the bezel 14 will become visible to the observer at a smaller viewing angle. Also, Equation 2 shows the needed length L of the distribution of prisms 22 from the edge of the display cover to conceal the bezel will decrease for small gaps $G_A$, meaning that image artifacts remain localized within a small portion of the image close to the edges of the display device. Referring now to FIG.14, an observer O is depicted as viewing a display device 10 having a display panel 12 surrounded by a bezel 14 having a width W. A single prism 22 of an array of prisms is illustrated. The prism 22 has a front facet 56, a non-transiting facet 48, and a back facet 50. The back facet 56 and the front facet 50 define a prism angle θ. Assuming prisms 22 are facing the observer O (on the observer side of the glass cover), the deviation angle δ can be calculated relative to prism angle θ and the gap to bezel width ratio $G_A/W$ determined while fixing the viewing angle to different values.

Figure 15:
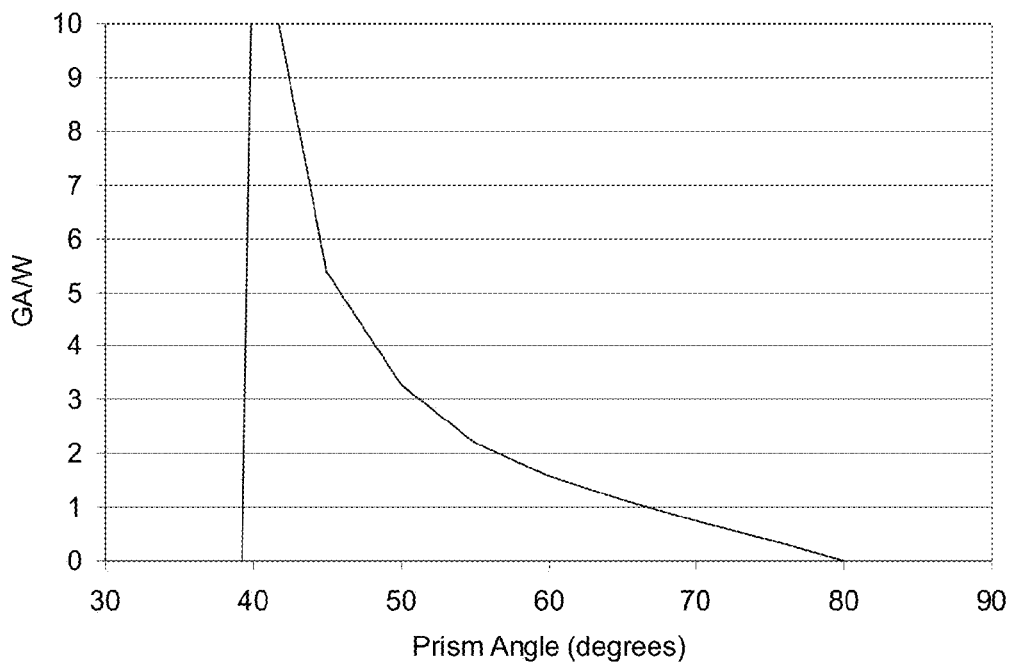
FIG.15 is a graph of the gap/bezel width ratio as a function of prism angle θ.

FIG.15 is a graph depicting the minimum gap—bezel width ratio $G_A/W$ by assuming it is desirable to maintain the bezel invisible up to a positive viewing angle +γ of +30 degrees. An index of refraction for the prisms was assumed as 1.56. As can be seen from FIG.15, prism angle θ should be at least 55° to maintain the bezel invisible to the observer and keep a reasonable gap $G_A$. An optimal design for the configuration of the bezel-concealing display cover 16 may be a function of other image artifacts described in more detail below.

Figure 16:
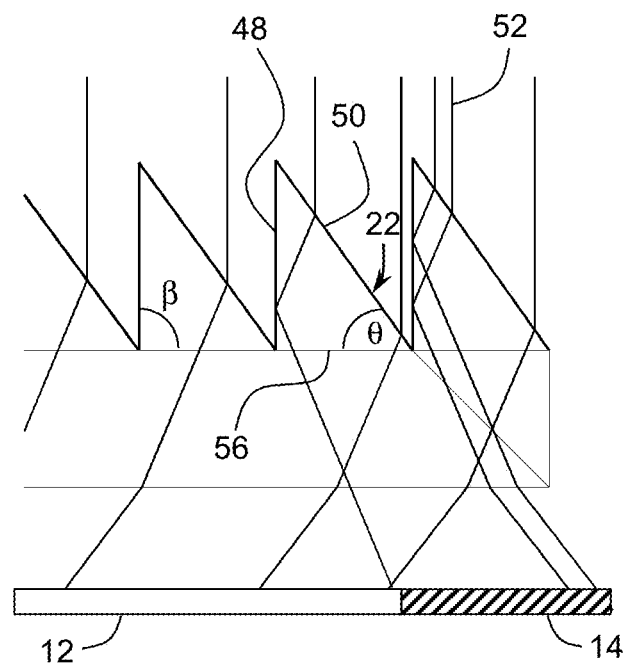
FIG.16 is a schematic view of an array of prisms disposed on an observer side of a display cover illustrating internal reflection within the prisms that causes a view of the bezel.

FIG.16 depicts a result when using prisms 22 with a small prism angle θ, and with the opposite, non-transiting facet 48 (a facet through which a ray of light does not transit) set at 90° to the adjacent, transiting front facet 50 (i.e., a right triangle formed by angle β). When viewing the display panel image along ray 52, the ray 52 is reflected by opposite facet 48 through total internal reflection and is propagated in a direction such that the bezel 14 is visible. As an example, with a prism angle θ of 55°, approximately 40% of the rays entering the prism are propagated in the wrong direction.

Figure 17:
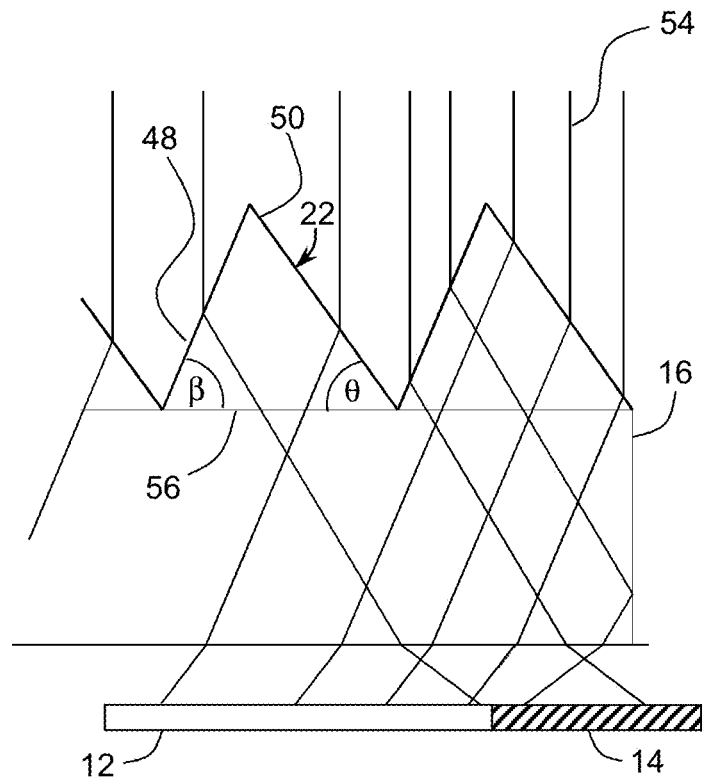
FIG.17 is a schematic view of an array of prisms disposed on an observer side of a display cover illustrating angles of the prism set so that an observer views the image through two entry facets, thereby allowing a view of the bezel.
Figure 18:
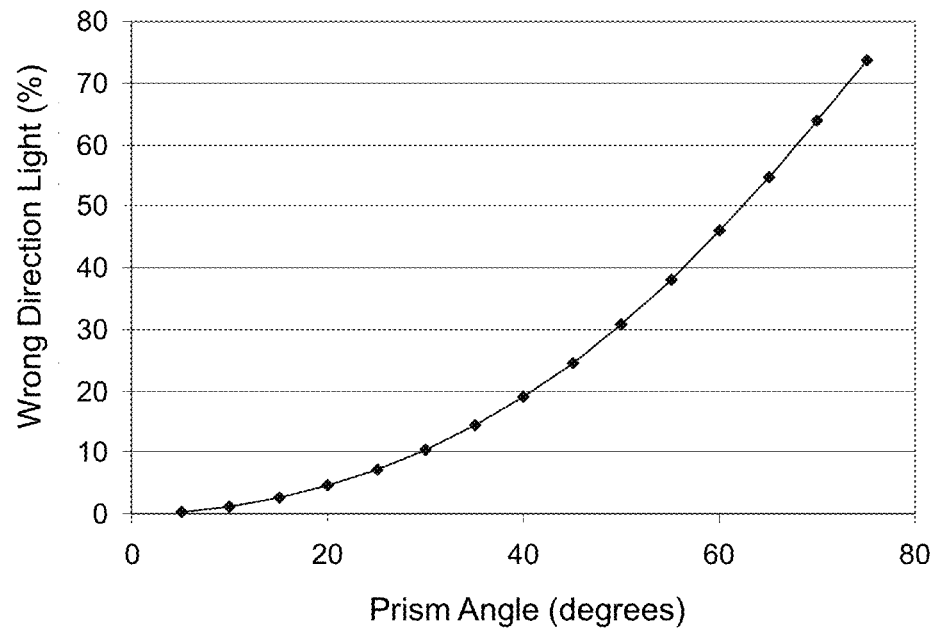
FIG.18 is a graph of the percent observer view in a wrong direction (toward the bezel) as a function of prism angle θ.

Alternatively, the angle β of the prism 22 is such that a non-transiting facet of the prism 22 is parallel to the transiting ray 54 inside the prism is shown in FIG.17. However, that part of the light will now be directly transmitted by one of the facets of prism 22 and, for a 55° prism angle θ, approximately 40% of light transiting the prism will still be propagated in the wrong direction. The graph in FIG.18 shows the amount of light refracted in a wrong direction as a function of prism angle θ, and illustrates that for a prism angle θ of about 55°, about 40% of the rays go to the wrong facet, meaning that the image as seen by observer O will look dimmer at the edges. While 40% may be acceptable to most observers, it is assumed an amount of wrongly-deviated light greater than 40% is not visually acceptable. Consequently, the extended image will be dimmer at its edge, and a prism angle θ of 55° is the maximum prism angle to maintain the brightness decrease below 40%.

Figure 19:
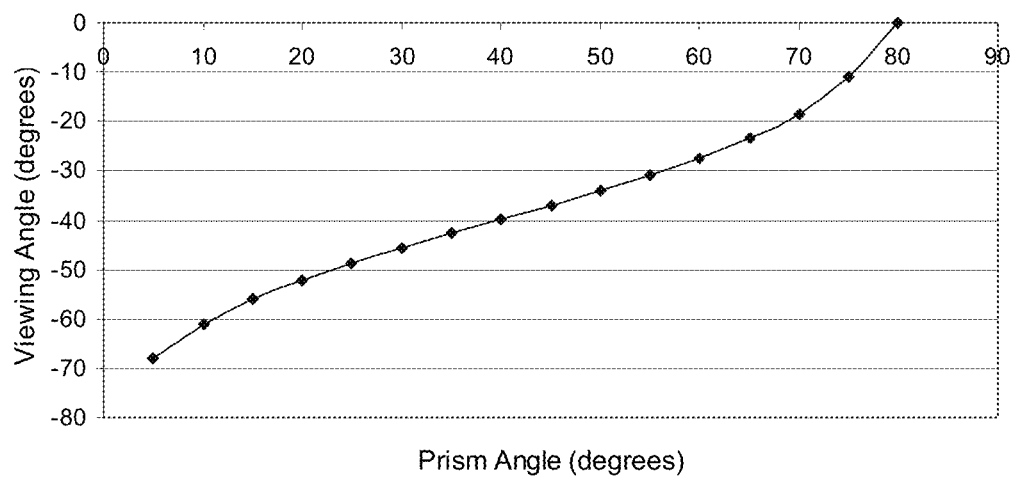
FIG.19 is a graph of a viewing angle for which total internal reflection occurs as a function of prism angle.

Referring once again to FIG.14, when the prism 22 is facing observer O and is positioned on a flat glass substrate, the back facet 56 (the facet at display cover 16) is parallel to the plane of display panel 12. At large negative viewing angles (−γ), the angle of incidence of a light ray at back facet 56, becomes very large and the ray is reflected in total internal reflection at back facet 56. The graph of FIG.19 depicts prism angle θ as a function of the viewing angle γ for the onset of total internal reflection within a prism, and shows that for a prism angle θ of about 55°, total internal reflection begins at a viewing angle γ of about −31°. For a negative viewing angle −γ less negative than about −31°, prism 22 will look like a diffusing reflector.

Figure 20:
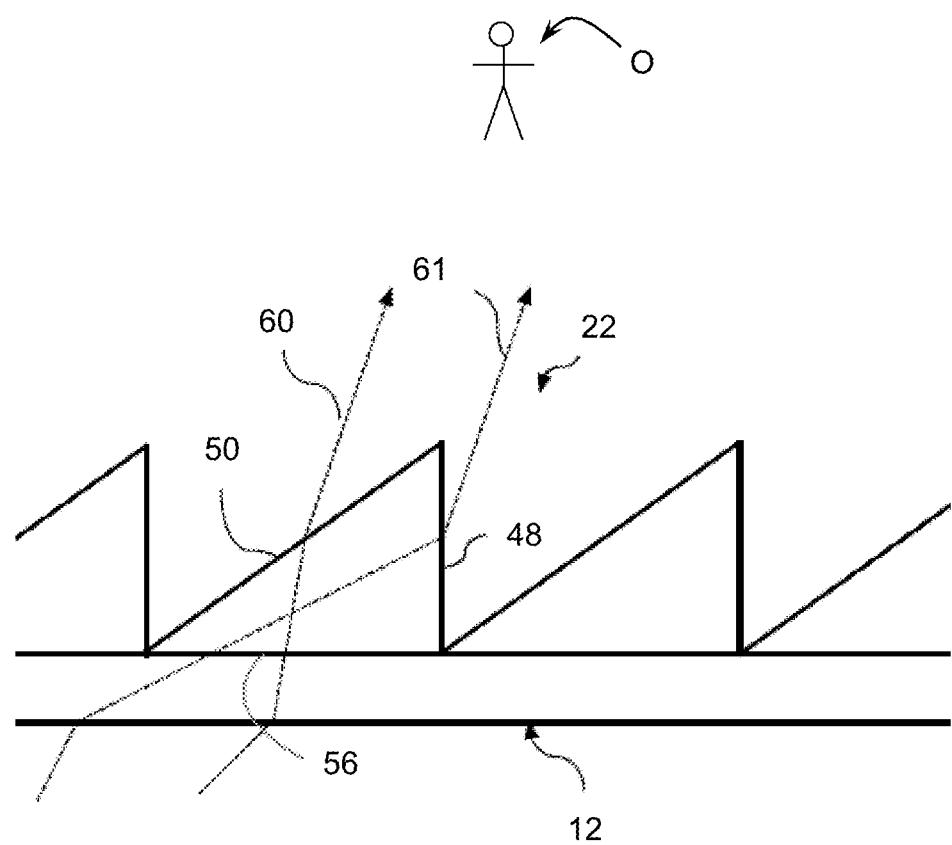
FIG.20 is a schematic illustration of a prism of a bezel-concealing display cover producing a parasitic image.

In some instances, when the observer is viewing the bezel-concealing display cover 16 within a particular viewing angle range, he or she may see two, offset images. FIG.20 depicts a portion of a bezel-concealing display cover 16 as seen by an observer O. The observer O sees two images: one shifted image that is created by light ray 21 propagating through a transiting front facet 50 of prism 22, and one parasitic image that is created by light ray 61 propagating through facet 48, which is supposed to be non-transiting. In one embodiment, the double-image is mitigated by making the non-transiting facet of each prism opaque such that light is prevented from being transmitted therethrough. For example, the non-transiting facets may be coated with an opaque coating (e.g., by an electrostatic painting process). Therefore, light may only pass through the transiting front facet 50 of the prisms 22.

Figure 21:
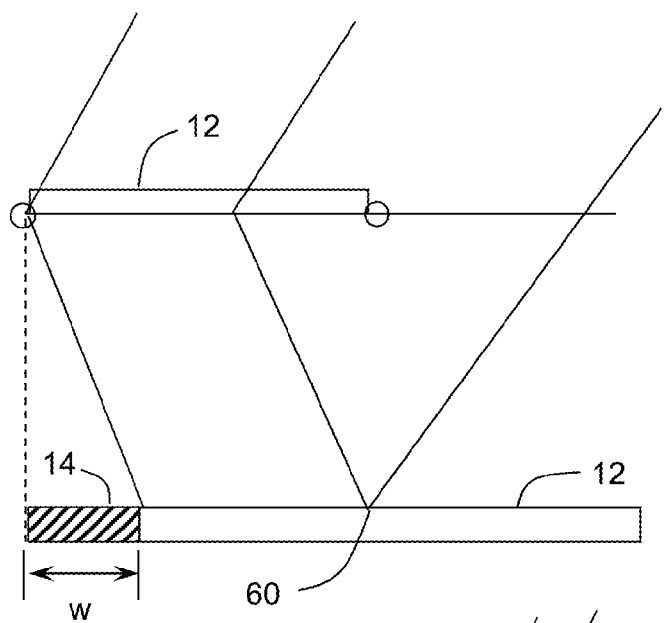
FIG.21 is a schematic view of how an image point is viewed double by an observer when the prisms of a prism array on the display cover have equal angles.

Referring now to FIG.21, when the prisms (e.g. prism 22) have a constant angle θ, objects (such as the image portion at point 60) near the edge of the display panel may be duplicated which can be visually disturbing. This distortion may be mitigated by blurring the image seen through the prisms 22. Alternatively, the prism angle θ may be slowly decreased spatially over a distance L from the edge of the display cover inward until deviation angle δ approaches zero. Assuming the prism angle deceleration is linear, the prism array becomes equivalent to a cylindrical Fresnel lens, and will have a focal point located somewhere in space.

Figure 22A:
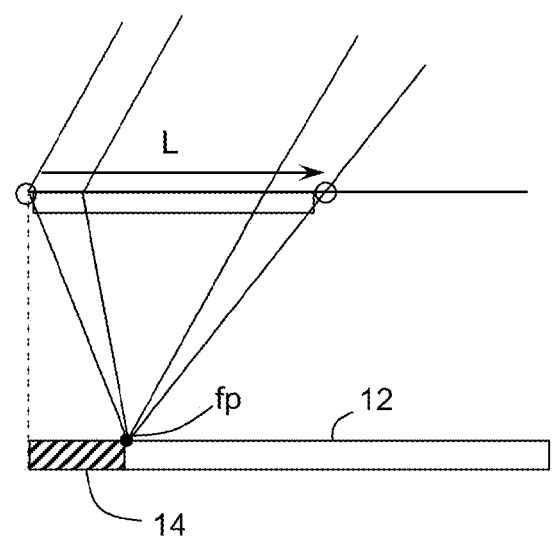
FIG.22A is a schematic view of an array of prisms disposed on an observer side of a display cover wherein the prism angles of an array of prisms decreases at a slow rate over the length of the array of prisms from an edge of the display cover.
Figure 22B:
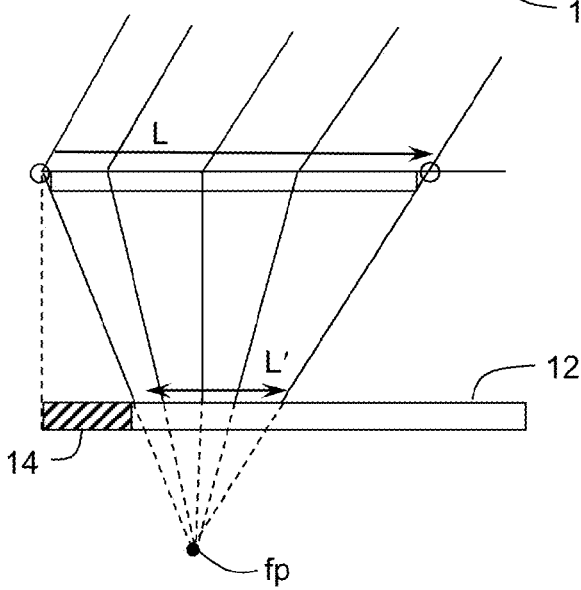
FIG.22B is a schematic view of an array of prisms disposed on an observer side of a display cover wherein the prism angles of an array of prisms decreases at a fast rate over the length of the array of prisms from an edge of the display cover.

FIGS. 22A and 22B show two different cases of prism angle deceleration. FIG.22A schematically illustrates an example where the prism angle θ partially decreases rapidly. The focal point $f_p$ is located on the surface of the display panel. Accordingly, the distance L from the edge of the display cover 16 over which prisms are needed can be determined using Equation 2 above. However, in this instance, all the light seen by observer O is coming from the same point, resulting in a large magnification factor. FIG.22 schematically illustrates an example where the prism angle θ spatially decreases more slowly than the example depicted in FIG.21. For the slower spatial decrease in prism angle θ shown in FIG.22B, the focal point $f_p$ is located behind display panel 12 and the magnification factor (L/L') is reduced. However, the distance L over which prisms will be needed increases, meaning other defects, such as total internal reflection described above, will be seen on a larger portion of the image. Consequently, as an example and not a limitation, a prism angle θ in a range from about 50° to about 60°, for example about 55°, may provide an adequate compromise, and results in a gap $G_A$ of about 10 mm for a 4 mm wide bezel.

The above-described image artifacts may be mitigated by balancing the various artifacts and developing a design process to design an optimum bezel-concealing display cover 16 for the intended viewing angles and distances. An exemplary process of determining an appropriate design is described below. First, the positive viewing angle +γ at which bezel 14 becomes visible may be determined. For example, during testing, a positive viewing angle of about 30° resulted in an acceptable gap. Second, the gap to bezel ratio as a function of a starting prism angle θ may be determined. In accordance with the graph of FIG. 15, a +30° viewing angle, the $G_A$/W ratio is about 2.2 for a starting prism angle $θ_1$ of 55°. Next, it may be determined if the starting prism angle $θ_1$ (i.e., 55° for this example) results in an acceptable amount of light leaking through the wrong facet as well as the angle where the prisms begin to produce total internal reflection of the incoming light rays. Because using very large prism angles creates image artifacts, the starting prism angle $θ_1$ should be reasonably small, for example, equal to or less than about 55°.

Figure 23:
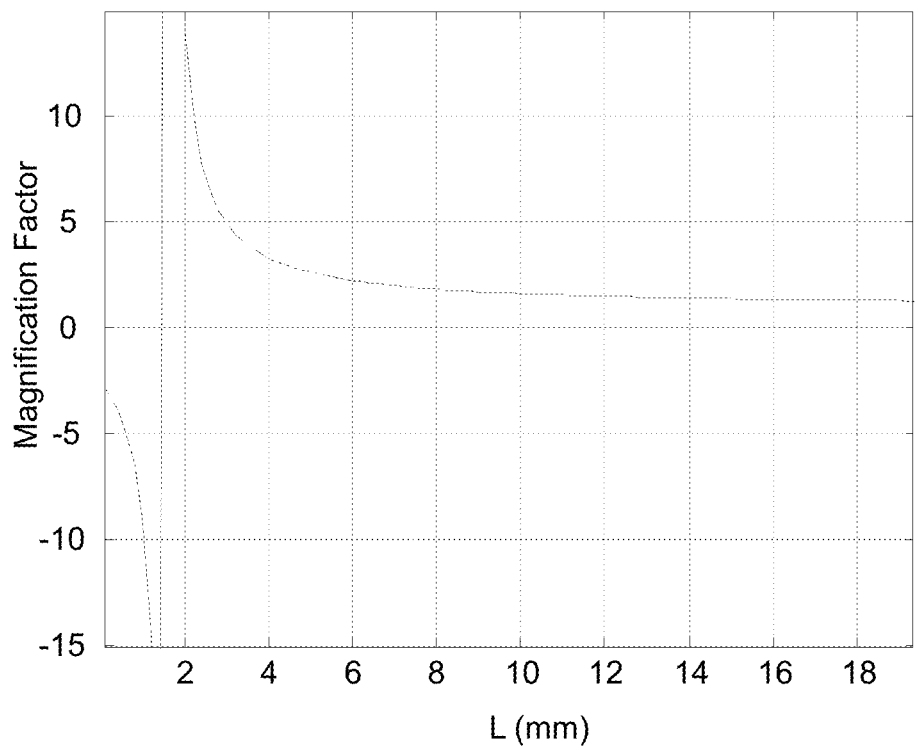
FIG.23 is a graph of the magnification factor as a function of the distance from the edge of the display cover that the array of prisms extends.
Figure 24:
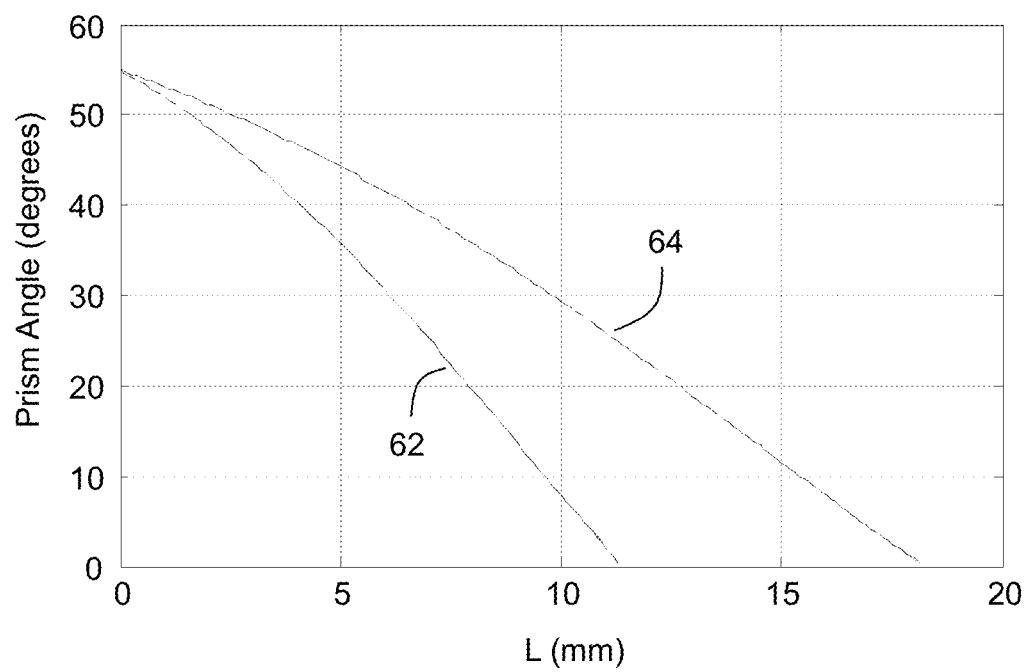
FIG.24 is a graph of prism angle as a function of the distance from the edge of the display cover that the array extends for a given magnification factor.

Once a starting prism angle $θ_1$ is selected, an angle deceleration rate is determined. The deceleration rate should be as fast as possible so that image artifacts remain localized in a small area, but also decelerate slow enough such that pixel magnification (banding) is not too high. For a linear deceleration, the magnitude of image magnification is very high at the edge of the image, resulting in localized pixel magnification. In some instances the magnification can be negative, meaning the image is inverted. This effect is due primarily to the spherical aberration generated by the Fresnel lens. FIG.23 depicts image magnification as a function of a distance L from the edge of the display cover. Accordingly, a magnification factor can be selected by computationally holding the magnification factor constant as the prism angle deceleration rate is increased. It can be shown that this is equivalent to adding aspherization to the Fresnel lens design. FIG.24 shows prism angle variation by fixing the magnification factor respectively at five (curve 62) and two (curve 64).

EXAMPLE 1

A starting prism angle of 55° was selected with a magnification factor of 2, resulting in a prism array length L (distance from the edge of the display cover over which the prism array extended) of about 18 mm. The gap $G_A$ was determined to be approximately 9 mm for a 4 mm bezel width. Accordingly, the onset of bezel visibility would occur at a viewing angle of approximately 30° and the onset of total internal reflection would start at a viewing angle γ of −30°.

EXAMPLE 2

A starting prism angle of 55° was selected with a magnification factor of 5, resulting in a prism array length L of about 11.3 mm. The gap $G_A$ was determined to be approximately 9 mm for a 4 mm bezel width. Accordingly, the onset of bezel visibility would occur at a viewing angle of approximately 30° and the onset of total internal reflection would start at a viewing angle γ of −30°.

EXAMPLE 3

A starting prism angle of 55° was selected with a magnification factor of 2, resulting in a prism array length L of about 45 mm. The gap $G_A$ was determined to be approximately 22 mm for a 10 mm bezel width. Accordingly, onset of bezel visibility would occur at a viewing angle of approximately 30° and the onset of total internal reflection would start at a viewing angle γ of −30°.

Figure 25:
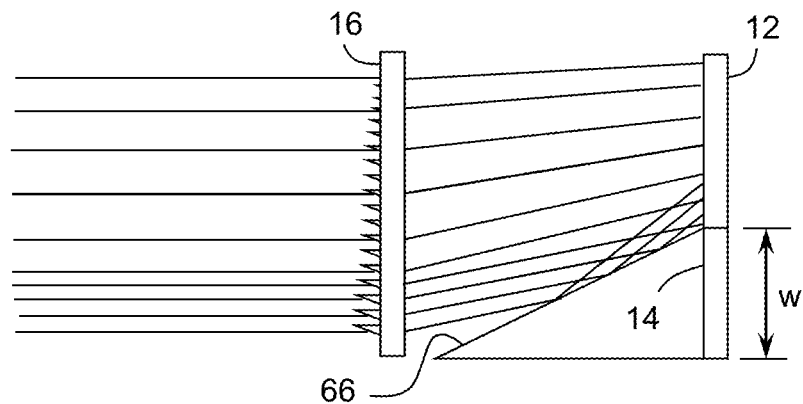
FIG.25 is a schematic view of a display cover comprising prisms and a display panel, wherein a reflector is positioned between the display cover and the display panel.

As described above, as the viewing angle becomes more positive, the bezel 14 becomes visible. Referring now to FIG.25, visibility of the bezel 14 may be mitigated by providing a reflecting surface 66 to deviate light rays that would otherwise strike the bezel 14 (i.e. in a reverse direction, to avoid viewing the bezel 14). The reflecting surface 66 may be either polished and act as a mirror, or have some structure to partly diffuse light and make the reflected portion of the image partly blurred (fuzzy).

Figure 26:
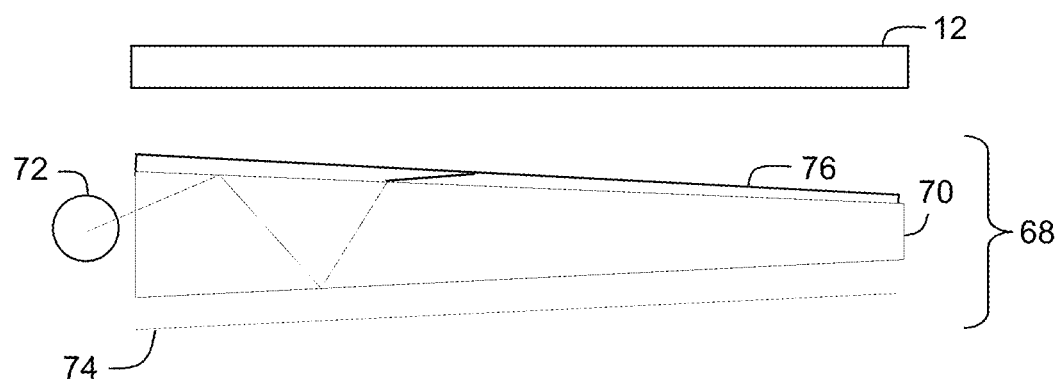
FIG.26 is a cross sectional side view of a light guide plate comprising a prism array at one surface of the light guide plate.

As explained above, the edge of the image may appear dimmer due to light leaking through the wrong prism facet, or being reflected by it. Another way to avoid such leakage comprises making the image locally brighter. For example, the amount by which the image appears too dim when the observer is at normal incidence may be calculated, and the image produced by the display panel 12 made correspondingly brighter. This can be done either by image processing (in which case it only works if the image itself is dim at the edge) or by backlighting. FIG.26 depicts a backlight assembly 68 according to one embodiment. The exemplary backlight assembly includes a light source 72, a reflecting surface 74, and a light guide plate 70. The image can be made locally brighter by increasing how much light is leaking out of the backlight light guide plate 70. It can be shown that this can be accomplished, for example, by attaching a shallow prism array 76 on the light guide plate.

Alternatively, the image can be blurred by an amount at least equal to the pixel size. This can be accomplished by introducing noise (small deviations) into the angles of the prisms, or by making the output facet of the prisms to have curvature as previously described in respect of FIG.11.

Figure 27:
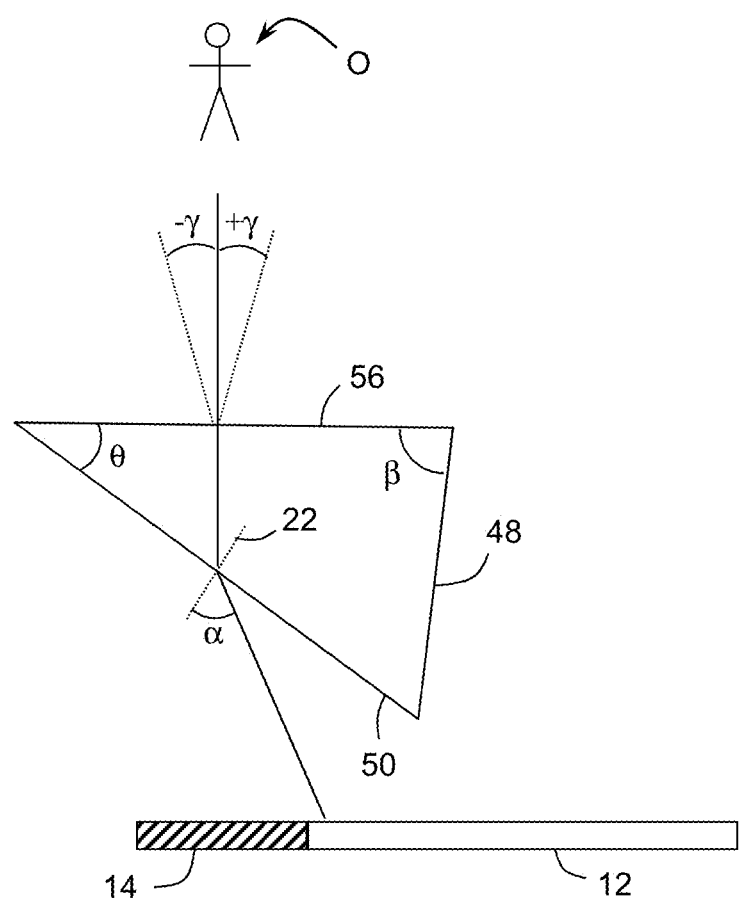
FIG.27 is a schematic view of a single prism of an array of prisms disposed on a display cover, wherein the prisms are positioned on the display panel side of the display cover.

FIG.27 illustrates an embodiment of the present disclosure wherein the prisms 22 are facing toward display panel 12, rather than away as in the embodiments described above. In this instance, the entry face of the prism (facet 56) is pointing in the wrong direction. In other words, for a given light ray deflection angle, the angle of the exit ray over the prism facet (α) is necessarily larger than when the prisms are facing observer O (since in that case, facet 56 is parallel to the display). As a result, total internal reflection will occur for a much smaller viewing angle.

Figure 28:
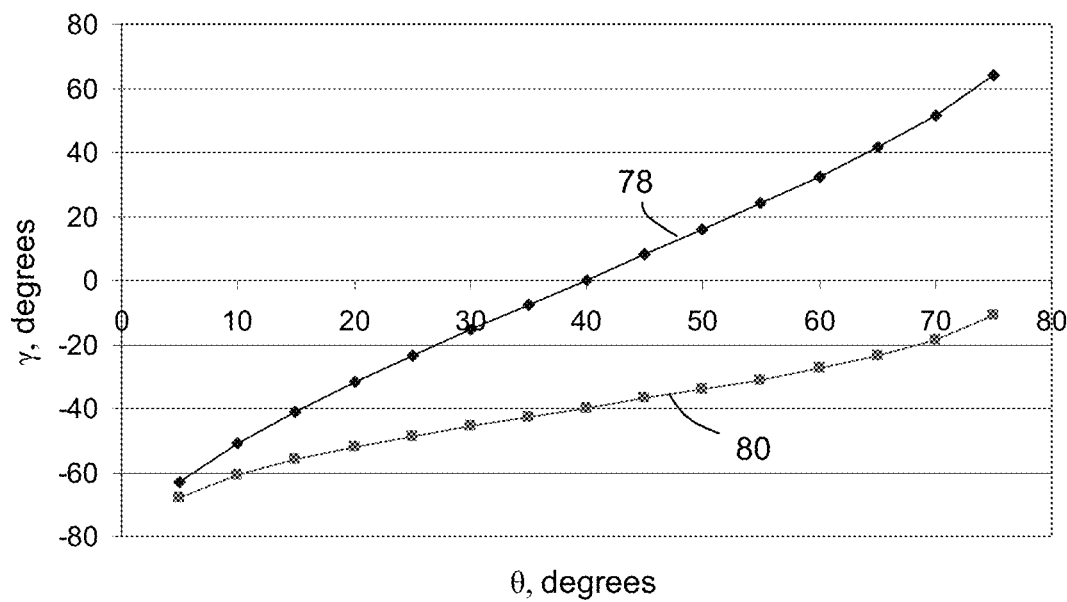
FIG.28 is a graph of the angle for the viewing angle at which total internal reflection occurs as a function of prism angle for prisms positioned on the observer side of the display cover and prisms positioned on the display panel side of the display cover.

FIG.28 is a graph that shows the viewing angle γ at which prisms 22 produce total internal reflection in two situations: when the prisms are facing the observer (curve 78), or when the prisms are facing the display panel 12 (curve 80). As an example, for a prism angle θ of 40°, prisms 22 are in total internal reflection for all negative viewing angles −γ when facing display panel (curve 80) while total internal reflection only begins for negative viewing angles −γ less negative than −40 degrees when prisms 22 are facing the observer. Consequently, when positioning prisms 22 on the back side of a flat cover facing display panel 12, the prism angle θ will need to be very small to avoid total internal reflection and a large gap.

Figure 29:
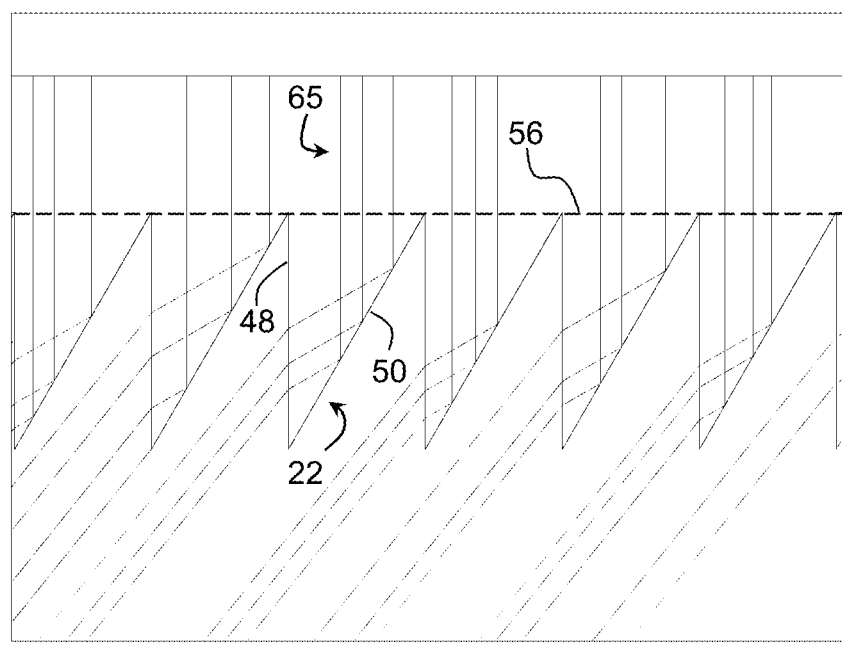
FIG.29 is a schematic view of an array of prisms positioned on the display panel side of the display cover illustrating total internal reflection.

Referring now to FIG. 29, because microprisms facing display panel 12 tend to produce total internal reflection, in some embodiments the total internal reflection mode may be selected to be the nominal mode that is viewed by the observer. FIG. 29 illustrates an embodiment wherein one of the facets (e.g., facet 50) produces total internal reflection and the other facet (e.g., facet 56) is in transmission. More particularly, light rays enter the prisms at facet 48, are reflected at facet 50 by total internal reflection, and exit the prisms at facet 56. Because facet 48 is producing reflection of incoming light rays 65, very large deflection angles can be produced independent of the refractive index of the prisms. This allows for an extremely small gap $G_A$ between the bezel-concealing display cover 16 and the display device 10.

For the purposes of describing and defining embodiments of the present disclosure it is noted that the terms "substantially," "approximately," and "about" are utilized herein to represent the inherent degree of uncertainty that may be attributed to any quantitative comparison, value, measurement, or other representation.

It is noted that recitations herein of a component of a particular embodiment being "configured" in a particular way, or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is also noted that the use of the phrase "at least one" in describing a particular component or element does not imply that the use of the term "a" in describing other components or elements excludes the use of more than one for the particular component or element. More specifically, although a component may be described using "a," it is not to be interpreted as limiting the component to only one.

While particular embodiments have been illustrated and described herein, it should be understood that various other changes and modifications may be made without departing from the spirit and scope of the claimed subject matter. More specifically, although some aspects of the embodiments described are identified herein as preferred or particularly advantageous, it is contemplated that the claimed subject matter is not necessarily limited to these preferred aspects.

The invention claimed is:

1. A bezel-concealing display cover for coupling to a display device comprising a bezel and a display panel, the bezel-concealing display cover comprising:
    a perimeter portion comprising a first surface and a second surface, wherein the perimeter portion is configured to be offset from the bezel of the display device by a gap $G_A$;
    a first array of prisms on at least one of the first surface or the second surface of the perimeter portion, the first array of prisms extending from an edge of the perimeter portion to a distance L, wherein:
        each prism of the first array of prisms comprises a first light transiting facet, a second light transiting facet, and a prism angle θ between the first light transiting facet and the second light transiting facet, wherein the prism angle θ of the individual prisms of the first array of prisms non-linearly decreases in a direction from the edge of the perimeter portion toward a center of the bezel-concealing display cover at the distance L such that a rate of prism angle decrease at a midpoint between the edge of the perimeter portion and the distance L from the edge of the perimeter portion is greater than a rate of prism angle decrease proximate the edge of the perimeter portion and a rate of prism angle proximate the distance L from the edge of the perimeter portion;
        the first array of prisms is configured to shift a portion of an image proximate the bezel produced by the display panel such that the shifted portion of the image appears over the bezel to an observer; and
    a central region bounded by the perimeter portion, wherein the first array of prisms is not present at the central region.

2. The bezel-concealing display cover according to claim 1, wherein the central region is substantially transparent.

3. The bezel-concealing display cover according to claim 1, wherein the perimeter portion comprises glass, and the first array of prisms is integrated into the glass.

4. The bezel-concealing display cover according to claim 1, wherein the perimeter portion comprises glass, and the first array of prisms is provided by an angular filter positioned on the first surface or the second surface of the perimeter portion.

5. The bezel-concealing display cover according to claim 1, wherein:
    each individual prism of the first array of prisms comprises a transiting facet and a non-transiting facet;
    the transiting facet is transmissive to light produced by the display device; and
    the non-transiting facet is opaque.

6. The bezel-concealing display cover according to claim 1, wherein the first array of prisms are positioned on the first surface of the perimeter portion, and the first surface of the perimeter portion faces the observer.

7. The bezel-concealing display cover according to claim 1, wherein the first array of prisms are positioned on the second surface of the perimeter portion, and the second surface of the perimeter portion is configured to face the display device.

8. The bezel-concealing display cover according to claim 1, wherein the first array of prisms form a Fresnel lens.

9. The bezel-concealing display cover according to claim 8, wherein the Fresnel lens is aspheric.

10. The bezel-concealing display cover according to claim 1, wherein at least one facet of each prism of the first array of prisms comprises a curve.

* * * * *